United States Patent
Kizer et al.

(10) Patent No.: US 9,225,561 B2
(45) Date of Patent: Dec. 29, 2015

(54) PIPELINED CHARGE REDISTRIBUTION DECISION FEEDBACK EQUALIZER (DFE) FOR A RECEIVER

(71) Applicant: Avago Technologies General IP (Singapore) Pte. Ltd, Singapore (SG)

(72) Inventors: Jade Michael Kizer, Windsor, CO (US); Robert B. Roze, Fort Collins, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 20 days.

(21) Appl. No.: 13/905,870

(22) Filed: May 30, 2013

(65) Prior Publication Data

US 2014/0355662 A1    Dec. 4, 2014

(51) Int. Cl.
*H04L 27/06* (2006.01)
*H04L 25/03* (2006.01)
*H04L 25/02* (2006.01)

(52) U.S. Cl.
CPC ...... *H04L 25/03057* (2013.01); *H04L 25/0276* (2013.01); *H04L 25/03146* (2013.01); *H04L 27/06* (2013.01)

(58) Field of Classification Search
CPC ............ H03D 3/24; H03M 7/30; H03M 7/38; H03M 1/38; H03M 7/00; H03K 5/19; H03K 5/159; H04B 1/38; H04B 15/00; H04B 17/00; H04L 27/01
USPC .................. 327/100, 147, 156; 341/150, 161; 375/219, 229, 232, 233
See application file for complete search history.

(56) References Cited

U.S. PATENT DOCUMENTS

| | | | |
|---|---|---|---|
| 5,946,351 A | 8/1999 | Ariyavisitakul et al. | |
| 6,061,279 A * | 5/2000 | Toda et al. | 365/194 |
| 7,489,725 B2 | 2/2009 | Jaffe et al. | |
| 7,539,243 B1 * | 5/2009 | Toifl et al. | 375/229 |
| 8,315,301 B1 | 11/2012 | He | |
| 8,686,888 B2 * | 4/2014 | Chou et al. | 341/161 |
| 2002/0181575 A1 | 12/2002 | Birru | |
| 2012/0044983 A1 | 2/2012 | Kerr | |
| 2012/0207196 A1 * | 8/2012 | Zerbe et al. | 375/219 |
| 2014/0232464 A1 * | 8/2014 | Song | H04L 27/01 330/258 |

OTHER PUBLICATIONS

Jiang et al. Energy-Efficient Decision Feedback Equalizer Using SAR-Like Capacitive Charge Summation; Oregon State University; pp. 249-252; 2010.

* cited by examiner

*Primary Examiner* — Sam K Ahn
*Assistant Examiner* — Shawkat M Ali

(57) ABSTRACT

A pipelined decision feedback equalizer (DFE) includes a programmable digital-to-analog converter (DAC) configured to provide a programmable voltage to a plurality of decision feedback equalized (DFE) sections, a capacitive element associated with each DFE section, the capacitive element coupled to an input connection by a first switch and coupled to an output connection by a second switch, clock logic configured to control the first switch and the second switch so that a predefined voltage signal is applied to the capacitive element at a predefined time such that a charge corresponding to the predefined voltage signal is applied to the capacitive element, the clock logic causing the second switch to couple the capacitive element to the output connection so as to apply the voltage on the capacitive element as a filter coefficient to a summing element.

20 Claims, 8 Drawing Sheets

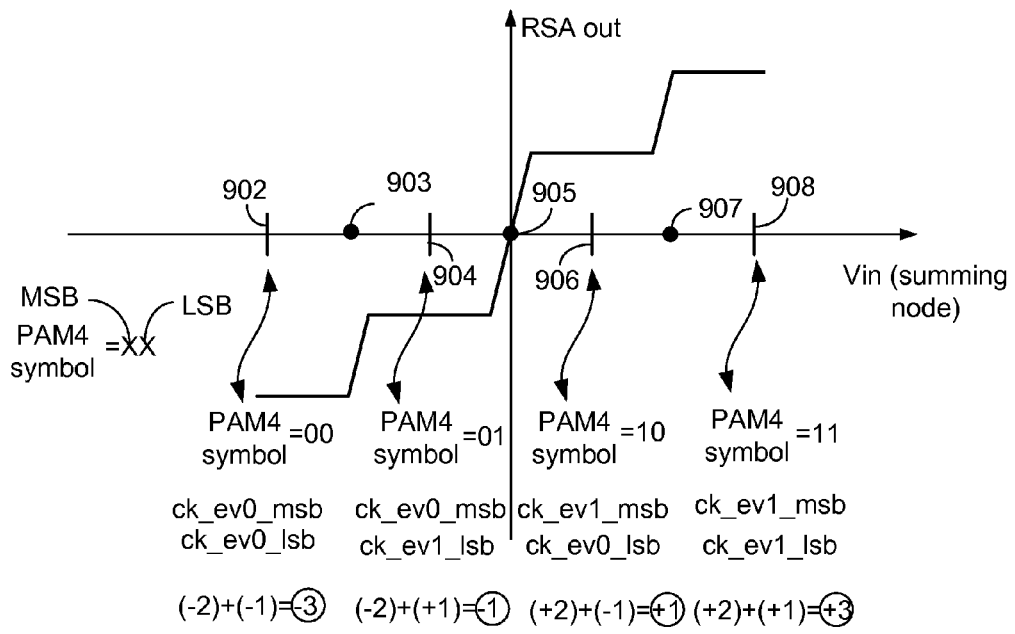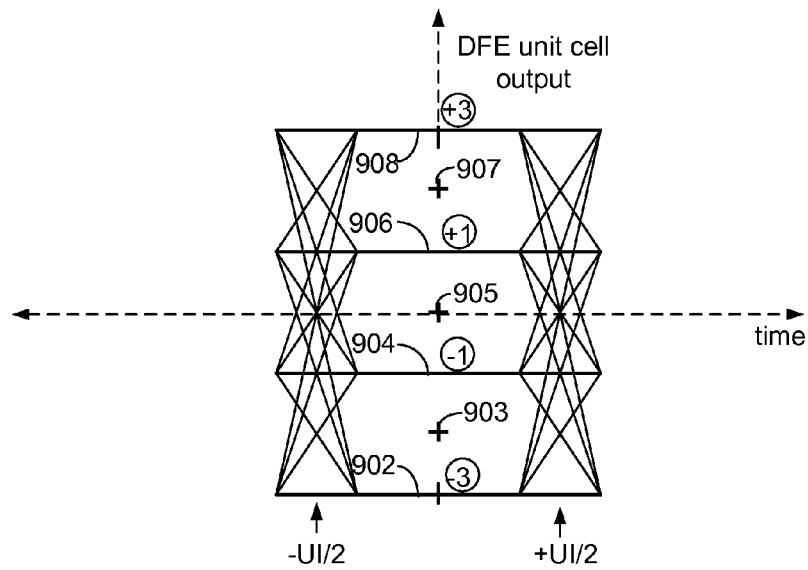
FIG. 9

PIPELINED CHARGE REDISTRIBUTION DECISION FEEDBACK EQUALIZER (DFE) FOR A RECEIVER

BACKGROUND

A modern integrated circuit (IC) must meet very stringent design and performance specifications. In many applications for communication devices, transmit and receive signals are exchanged over communication channels. These communication channels include impairments that affect the quality of the signal that traverses them. One type of IC that uses both a transmit element and a receive element is referred to as a serializer/deserializer (SERDES). The transmit element on a SERDES typically sends information to a receiver on a different SERDES over a communication channel. The communication channel is typically located on a different structure from where the SERDES is located. To correct for impairments introduced by the communication channel, a transmitter and/or a receiver on a SERDES or other IC may include circuitry that performs channel equalization. Channel equalization is a broad term that comprises many different technologies for improving the accuracy of communication between a transmitter and a receiver. One typical type of equalization is referred to as decision feedback equalization and is performed by a decision feedback equalizer (DFE). A DFE is typically implemented in a receiver and improves the signal-to-noise ratio (SNR) of the signal, but it can suffer from burst error propagation.

A feed forward equalizer (FFE) does not suffer from burst error propagation, but nor does it provide the improvement in SNR as does a DFE.

Additionally, a DFE can only be utilized for post cursor equalization, where a FFE can be used for either or both of pre or post cursor equalization.

Moreover, these drawbacks become more pronounced when attempting to design and fabricate a receiver that can operate using both PAM 2 and PAM 4 modalities. The acronym PAM refers to pulse amplitude modulation, which is a form of signal modulation where the message information is encoded into the amplitude of a series of signal pulses. PAM is an analog pulse modulation scheme in which the amplitude of a train of carrier pulses is varied according to the sample value of the message signal. A PAM 2 communication modality refers to a modulator that takes one bit at a time and maps the signal amplitude to one of two possible levels (two symbols), for example −1 volt and 1 volt. A PAM 4 communication modality refers to a modulator that takes two bits at a time and maps the signal amplitude to one of four possible levels (four symbols), for example −3 volts, −1 volt, 1 volt, and 3 volts. For a given baud rate, PAM 4 modulation can transmit up to twice the number of bits as PAM 2 modulation.

SUMMARY

In an embodiment, a pipelined decision feedback equalizer (DFE), comprises a programmable digital-to-analog converter (DAC) configured to provide a programmable voltage to a plurality of decision feedback equalized (DFE) sections, a capacitive element associated with each DFE section, the capacitive element coupled to an input connection by a first switch and coupled to an output connection by a second switch, clock logic configured to control the first switch and the second switch so that a predefined voltage signal is applied to the capacitive element at a predefined time such that a charge corresponding to the predefined voltage signal is applied to the capacitive element, the clock logic causing the second switch to couple the capacitive element to the output connection so as to apply the voltage on the capacitive element as a filter coefficient to a summing element.

Other embodiments are also provided. Other systems, methods, features, and advantages of the invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 9 is a diagram showing the relationship between the output of the DFE unit cell of FIG. 7 and a PAM 4 feedback word.

DETAILED DESCRIPTION

A pipelined charge redistribution decision feedback equalizer (DFE) for a receiver can be implemented in any integrated circuit (IC) that uses a digital direct conversion receiver (DCR). In an embodiment, the pipelined charge redistribution decision feedback equalizer (DFE) for a receiver is implemented in a serializer/deserializer (SERDES) receiver operating at a 50 gigabit per second (Gbps) data rate by implementing a pulse amplitude modulation (PAM) 4 modulation methodology operating at 25 GBaud (Gsymbols per second). The 50 Gbps data rate is enabled, at least in part, by the pipelined implementation to be described below, and is backward compatible with PAM 2 modulation methodologies operating at a data rate of 25 Gbps.

As used herein, the term "cursor" refers to a subject bit, the term "pre-cursor" or "pre" refers to a bit that precedes the "cursor" bit and the term "post-cursor" or "post" refers to a bit that is subsequent to the "cursor" bit.

Figure 1:
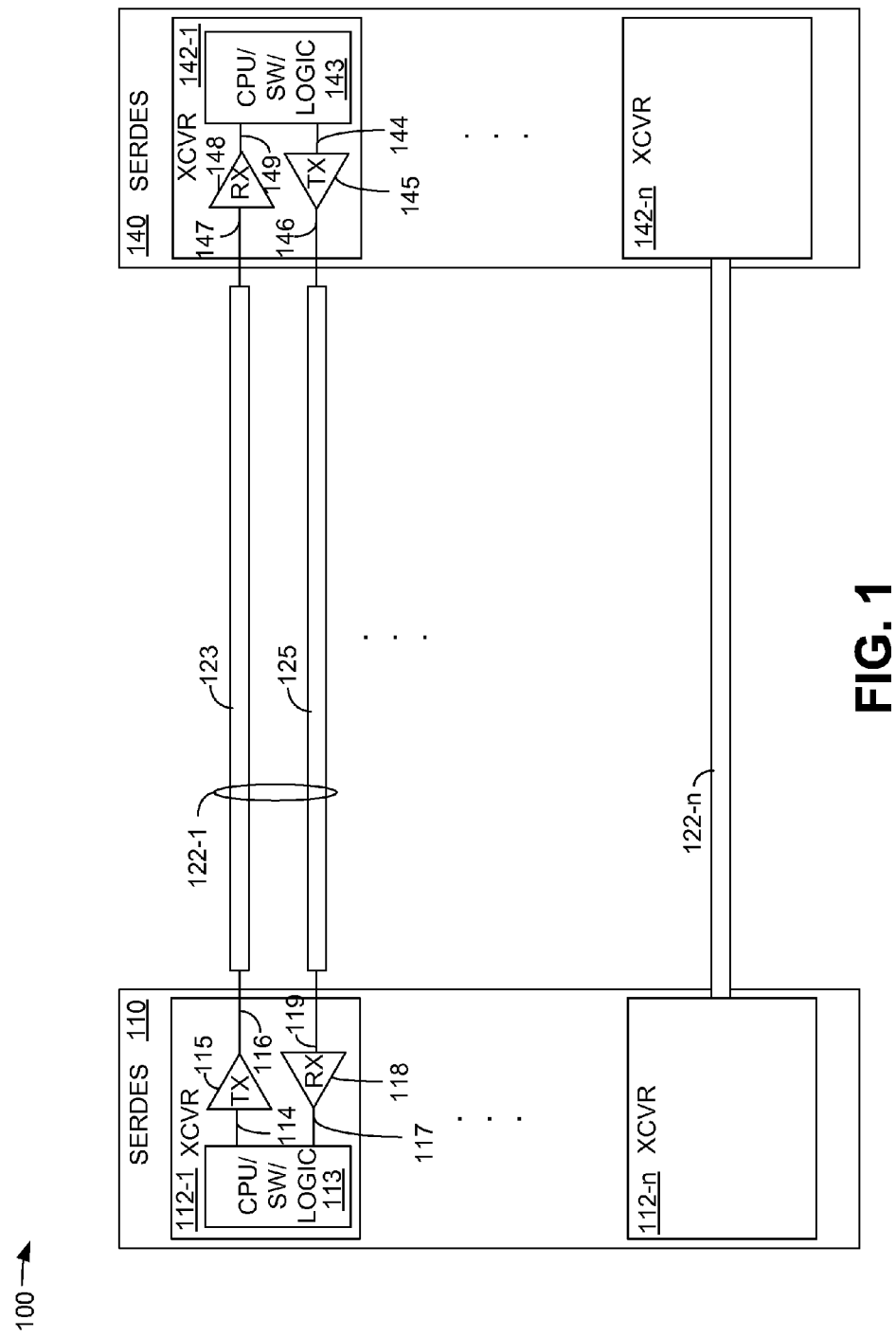
FIG. 1 is a schematic view illustrating an example of a communication system in which the pipelined charge redistribution decision feedback equalizer (DFE) for a receiver can be implemented.

FIG. 1 is a schematic view illustrating an example of a communication system 100 in which the pipelined charge redistribution decision feedback equalizer (DFE) for a receiver can be implemented. The communication system 100 is an example of one possible implementation. The communication system 100 comprises a serializer/deserializer (SERDES) 110 that includes a plurality of transceivers 112. Only one transceiver 112-1 is illustrated in detail, but it is understood that many transceivers 112-n can be included in the SERDES 110.

The transceiver 112-1 comprises a logic element 113, which includes the functionality of a central processor unit (CPU), software (SW) and general logic, and will be referred to as "logic" for simplicity. It should be noted that the depiction of the transceiver 112-1 is highly simplified and intended to illustrate only the basic components of a SERDES transceiver.

The transceiver 112-1 also comprises a transmitter 115 and a receiver 118. The transmitter 115 receives an information signal from the logic 113 over connection 114 and provides a transmit signal over connection 116. The receiver 118 receives an information signal over connection 119 and provides a processed information signal over connection 117 to the logic 113.

The system 100 also comprises a SERDES 140 that includes a plurality of transceivers 142. Only one transceiver 142-1 is illustrated in detail, but it is understood that many transceivers 142-n can be included in the SERDES 140.

The transceiver 142-1 comprises a logic element 143, which includes the functionality of a central processor unit (CPU), software (SW) and general logic, and will be referred to as "logic" for simplicity. It should be noted that the depiction of the transceiver 142-1 is highly simplified and intended to illustrate only the basic components of a SERDES transceiver.

The transceiver 142-1 also comprises a transmitter 145 and a receiver 148. The transmitter 145 receives an information signal from the logic 143 over connection 144 and provides a transmit signal over connection 146. The receiver 148 receives an information signal over connection 147 and provides a processed information signal over connection 149 to the logic 143.

The transceiver 112-1 is connected to the transceiver 142-1 over a communication channel 122-1. A similar communication channel 122-n connects the "n" transceiver 112-n to a corresponding "n" transceiver 142-n.

In an embodiment, the communication channel 122-1 can comprise communication paths 123 and 125. The communication path 123 can connect the transmitter 115 to the receiver 148 and the communication path 125 can connect the transmitter 145 to the receiver 118. The communication channel 122-1 can be adapted to a variety of communication methodologies including, but not limited to, single-ended, differential, or others, and can also be adapted to carry a variety of modulation methodologies including, for example, PAM 2, PAM 4 and others. In an embodiment, the receivers and transmitters operate on differential signals. Differential signals are those that are represented by two complementary signals on different conductors, with the term "differential" representing the difference between the two complementary signals. The two complementary signals can be referred to as the "true" or "t" signal and the "complement" or "c" signal. All differential signals also have what is referred to as a "common mode," which represents the average of the two differential signals. High-speed differential signaling offers many advantages, such as low noise and low power while providing a robust and high-speed data transmission.

Figure 2:
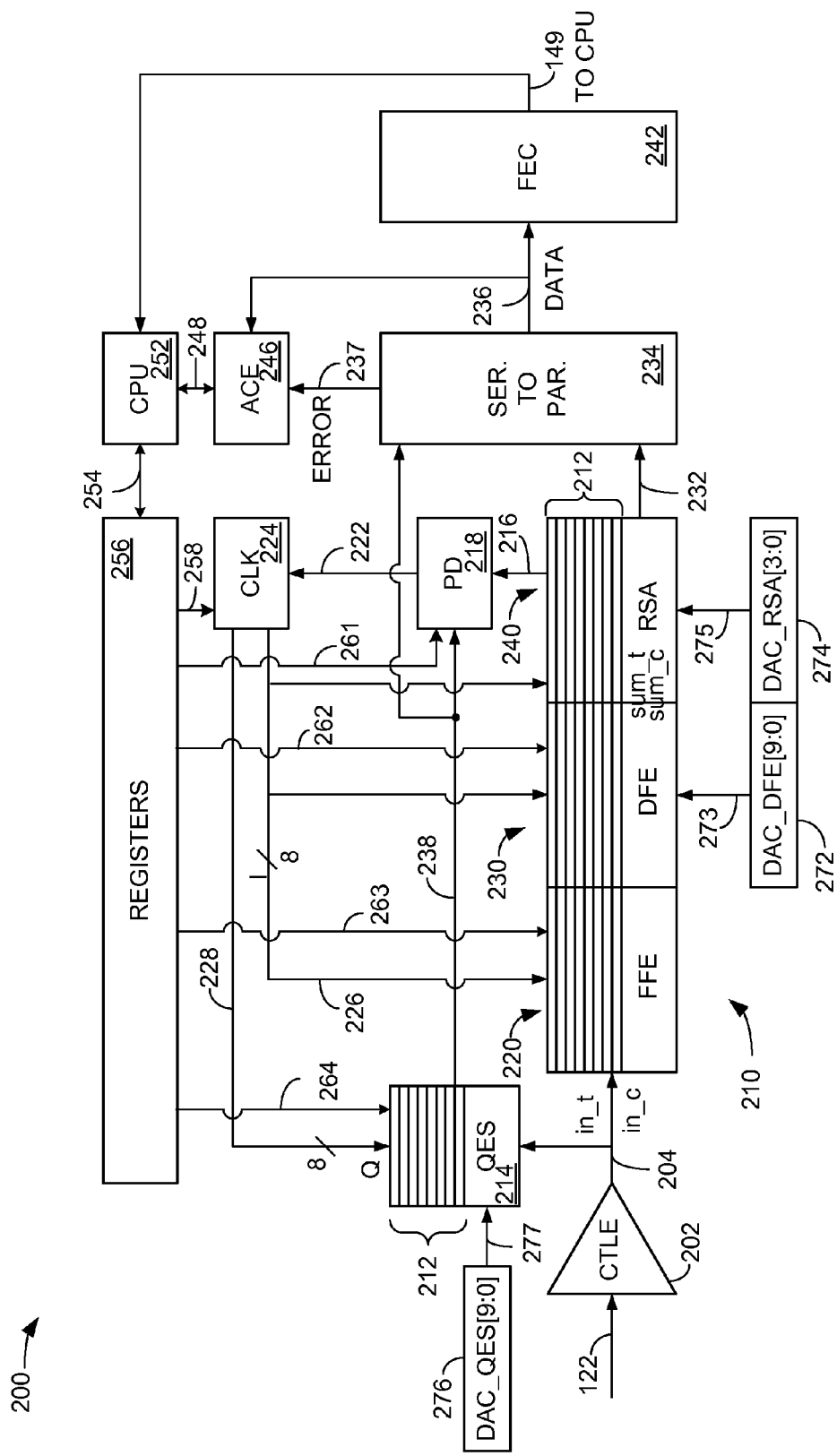
FIG. 2 is a schematic diagram illustrating an example receiver of FIG. 1.

FIG. 2 is a schematic diagram illustrating an example receiver of FIG. 1. The receiver 200 can be any of the receivers illustrated in FIG. 1. The receiver 200 comprises a continuous time linear equalizer (CTLE) 202 that receives the information signal from the communication channel 122 (FIG. 1). The output of the CTLE 202 is provided to a quadrature edge selection (QES) element 214 and to a pipelined processing system 210. The pipelined processing system 210 comprises a pipelined feed forward equalizer (FFE) 220, a pipelined decision feedback equalizer (DFE) 230 and a regenerative sense amplifier (RSA) 240.

The reference to a "pipelined" processing methodology refers to the ability of the FFE 220, the DFE 230 and the RSA 240 to process 8 pipelined stages 212 (referred to below as sections D0 through D7) simultaneously.

The DFE 230 receives a threshold voltage input from a digital-to-analog converter (DAC) 272 over connection 273. The RSA 240 receives a threshold voltage input from a digital-to-analog converter (DAC) 274 over connection 275. The DAC 272 and the DAC 274 can be can be any type of DAC that can supply a threshold voltage input based on system requirements. In an embodiment, a single DAC 272 can be shared across the pipelined stages of the DFE 230, thus reducing cost and maximizing processing efficiency.

The RSA 240 converts an analog voltage into a complementary digital value. The output of the RSA comprises sampled data/edge information and is provided over connection 216 to a phase detector (PD) 218. The output of the phase detector 218 comprises an update signal having, for example, an up/down command, and is provided over connection 222 to a clock (CLK) element 224. The clock element 224 provides an in-phase (I) clocking signal over connection 226 and provides a quadrature (Q) clocking signal over connection 228. The in-phase (I) clocking signal is provided to the pipelined FFE 220, the DFE 230, and to the RSA 240; and the quadrature (Q) clocking signal is provided to the QES element 214.

The QES element 214 receives a threshold voltage input from a DAC 276 over connection 277. The DAC 276 can be any type of DAC that can supply a threshold voltage input based on system requirements.

The output of the RSA 240 on connection 232 is a digital representation of the raw, high speed signal prior to extracting any line coding, forward error correction, or demodulation to recover data. In the case of PAM 2, the output is a sequence of ones and zeros. In the case of PAM N, it is a sequence of N binary encoded symbols. For example, for PAM 4, the output comprises a string of four distinct symbols each identified by a different two bit digital word. The output of the RSA 240 is provided over connection 232 to a serial-to-parallel converter 234. The serial-to-parallel converter 234 converts the high speed digital data stream on connection 232 to a lower speed bus of parallel data on connection 236. The output of the serial-to-parallel converter 234 on connection 236 is the parallel data signal and is provided to a forward error correction (FEC) element 242. The output of the serial-to-parallel converter 234 on connection 237 is an error, or test, signal and is provided to an automatic correlation engine (ACE) 246. The error, or test, signal is used to drive system parameters to increase signal-to-noise ratio in the receiver 200, and can be generated in several ways. One way is to use samplers inside the QES element 214 to identify zero crossings (also called edge data, or the transition between data bits). Another method is to use auxiliary samplers inside the RSA element 240 to identify the high amplitude signals (equivalent to the open part of an eye diagram). So, for example, using the edge data method, if a sampler inside the QES element 214 began to detect a positive signal where the zero crossing point should occur, then the ERROR signal on connection 237 would increase, and various system parameters could be driven to reduce that error. The output of the FEC 242 is provided over connection 149 to the CPU 252.

The output of the ACE 246 is provided over connection 248 to the CPU 252. The implementation of the ACE 246 could be done with hardware on chip, firmware off chip, or a combination of hardware and firmware, and a CPU, in which case the CPU 252 would read and write to the ACE 246 over connection 248. The ACE 246 compares the received data to a pseudorandom binary sequence (PRBS) pattern and provides a correlation function to support implementation of a least mean square (LMS) algorithm for tuning the receiver 200.

The CPU 252 is connected over a bi-directional link 254 to registers 256. The registers 256 store DFE filter coefficients, FFE controls, CTLE controls, RSA threshold voltage controls offset correction values for the RSA and QES elements, and controls for the DACs.

An output of the registers 256 on connection 261 is provided to the phase detector 218, an output of the registers 256 on connection 262 is provided to the pipelined DFE 230, an output of the registers 256 on connection 263 is provided to the pipelined FFE 220, and an output of the registers 256 on connection 264 is provided to the QES element 214. Although not shown for simplicity of illustration, the registers 256 also provide control outputs to the CTLE 202 and to all the DACs. In an embodiment, the output of the QES element 214 on connection 238 comprises sampled data/edge information and is provided to the phase detector 218 and the serial-to-parallel converter 234.

The elements in FIG. 2 generally operate based on a system clock signal that runs at a particular frequency, which corresponds to the baud rate of the data channel. A time period, referred to as a unit interval (UI) generally corresponds to a time period of one clock cycle of the system clock. For example, a transceiver could be communicating at 50 Gbps, using PAM4, the baud rate is 25 G baud per second, and one UI would be 40 ps=1/25 G.

Generally, a receive signal on connection 204 is applied to an array of FFE/DFE/RSA/QES sections. If an array of N sections is implemented, then each section can process the receive signal at a rate of 1/(UI*N) which significantly relaxes power requirements compared to the standard (un-pipelined) processing.

For example, a 25 Gbaud receive signal could be processed by an array of 8 sections, each section running at 3.125 GHz. The start time for each section is offset by 1 UI from its neighboring section, so that when the outputs from all 8 sections are summed together (signal 236), it is updated at the original 25 Gbaud rate.

Figure 3:
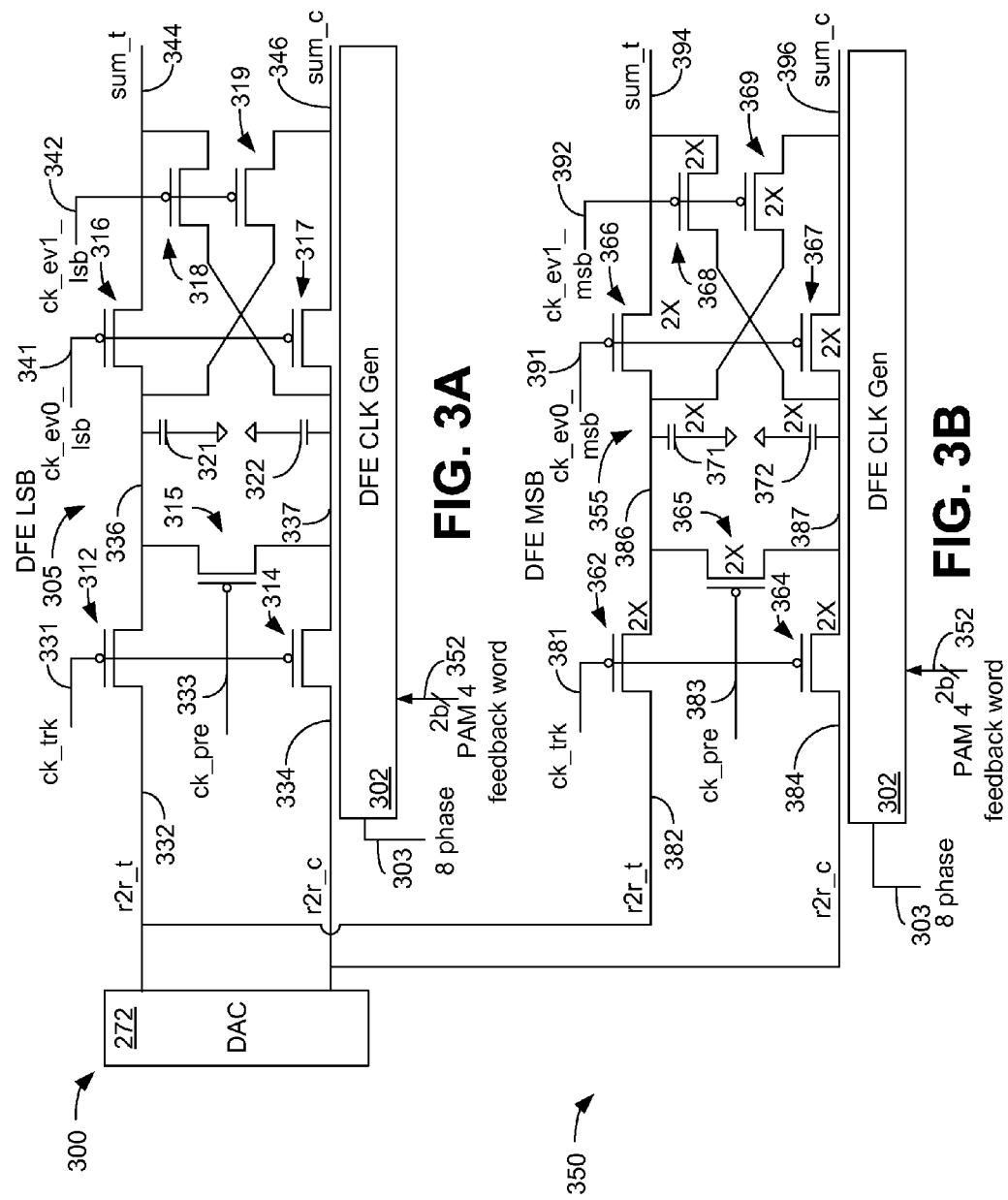
FIG. 3A is a schematic diagram of a unit cell of the DFE of FIG. 2.
FIG. 3B is a schematic diagram of a unit cell of the DFE of FIG. 2.

FIG. 3A is a schematic diagram of a unit cell 300 of the DFE 230 of FIG. 2. The DFE unit cell 300 is configured to operate on the least significant bit (LSB) of a PAM 4 feedback word. The DFE cell 300 comprises DFE clock generation logic 302 and switching logic 305. The switching logic 305 comprises switches 312, 314, 315, 316, 317, 318 and 319. The switches can be implemented using any switching technology including, for example, bipolar junction transistor (BJT) logic or any variation thereof, field effect transistor (FET) logic or any other available switching technology.

The DFE cell 300 also comprises a capacitor 321 and a capacitor 322. The DFE cell 300 is illustrated as operating on a differential signal with a "r2r_t" signal provided on connection 332 and a "r2r_c" signal provided on connection 334 from the DAC 272. The switches 312 and 314 receive a clock signal "ck_trk", the switches 316 and 317 receive a clock signal "ck_ev0_lsb" and the switches 318 and 319 receive a clock signal "ck_ev1_lsb." The switch 315 receives a clock signal "ck_pre" on connection 333. The "ck_pre" signal precharges the capacitors 321 and 322. The "true" output "sum_t" of the DFE cell 300 is provided over connection 344 and the "complement" output "sum_c" is provided over connection 346. The outputs "sum_t" and "sum_c" are provided to the RSA element 240 (FIG. 2).

The clock generation logic 302 receives an 8-phase input signal on connection 303 and receives a PAM 4 feedback word over connection 352. The clock generation logic 302 generates appropriate clock signals to allow the DFE cell 300 to switch at the appropriate time, and will be described in greater detail below.

FIG. 3B is a schematic diagram of a unit cell 350 of the DFE 230 of FIG. 2. The DFE unit cell 350 is configured to operate on the most significant bit (MSB) of a PAM 4 feedback word. The DFE cell 350 comprises DFE clock generation logic 302 and switching logic 355. The DFE clock generation logic 302 is shared by the switching logic 305 and the switching logic 355. The switching logic 355 comprises switches 362, 364, 365, 366, 367, 368 and 369. The switches can be implemented using any switching technology including, for example, bipolar junction transistor (BJT) logic or any variation thereof, field effect transistor (FET) logic or any variation thereof, or any other available switching technology.

The DFE cell 350 also comprises a capacitor 371 and a capacitor 372. The DFE cell 350 is illustrated as operating on a differential signal with a "r2r_t" signal provided on connection 382 and a "r2r_c" signal provided on connection 384 from the DAC 272. The switches 362 and 364 receive a clock signal "ck_trk", the switches 366 and 367 receive a clock signal "ck_ev0_msb" and the switches 368 and 369 receive a clock signal "ck_ev1_msb." The switch 365 receives a clock signal "ck_pre" on connection 383. The "ck_pre" signal precharges the capacitors 371 and 372. The "true" output "sum_t" of the DFE cell 350 is provided over connection 394 and the "complement" output "sum_c" is provided over connection 396. The outputs "sum_t" and "sum_c" are provided to the RSA element 240 (FIG. 2).

The value of the capacitors 321 and 322 in the DFE cell 300 are referred to as "1×" and the capacitors 371 and 372 in the DFE cell 350 are referred to as "2×." Similarly, the switches 312, 314, 315, 316, 317, 318 and 319 are configured using the nomenclature "1×" to correspond to the 1× of the capacitors 321 and 322. The switches 362, 364, 365, 366, 367, 368 and 369 are configured using the nomenclature "2×" to correspond to the 2× of the capacitors 371 and 372. The components labeled "2×" are twice the value of the components labeled "1×." By scaling the switch sizes by the same factor as the capacitor sizes, the charge and discharge times of the 1× or 2× cell is the same.

The clock generation logic 302 receives an 8-phase input signal on connection 303 and receives a PAM4 feedback word over connection 352. The clock generation logic 302 generates appropriate clock signals to allow the DFE cell 350 to switch at the appropriate time, and will be described in greater detail below.

Figure 4:
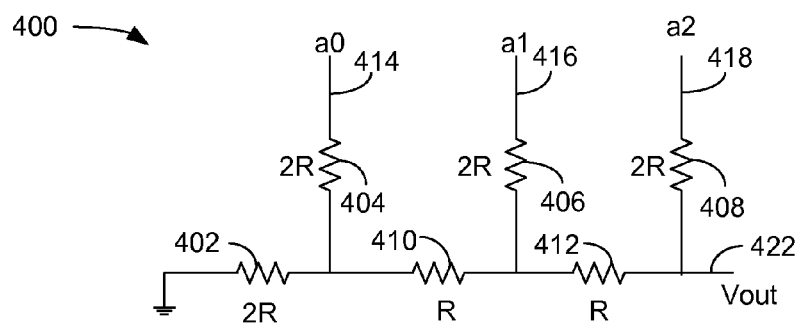
FIG. 4 is a schematic diagram illustrating an example 3 bit digital-to-analog converter (DAC) having an R2R architecture.

FIG. 4 is a schematic diagram illustrating an example 3 bit digital-to-analog converter (DAC) having an R2R architecture. The 3 bit DAC 400 comprises resistors 402, 404, 406, 408, 410 and 412, where the values of the resistors 410 and 412 are "R" and the values for the resistors 402, 404, 406 and 408 are "2R." A first bit "a0" is the least significant bit (LSB)

input on connection 214, a second bit "a1" is input on connection 216 and a third bit "a2" is the most significant bit (MSB) and is input on connection 218. The bits a0, a1 and a2 are driven by digital logic gates (not shown) and are ideally switched between zero volts (logic 0) and Vref (logic 1). The R2R architecture causes the digital bits to be weighted in their contribution to the output voltage Vout. In this example, three bits are shown (bits 2-0) providing $2^3$ or 8 possible analog voltage levels at the output. Depending on which bits are set to logic 0 and which bits are set to logic 1 the output voltage be a corresponding stepped value between 0 volts and (Vref minus the value of the minimum step, bit0 (bit a2 in this example)). The actual value of Vref (and 0 volts) will depend on the type of technology used to generate the digital signals.

The value of Vout on connection 422 is given by:

Vout=Vref·VAL/$2^N$, where Vref=VDD, and where N=the number of bits and VAL is the digital input value.

Figure 5:
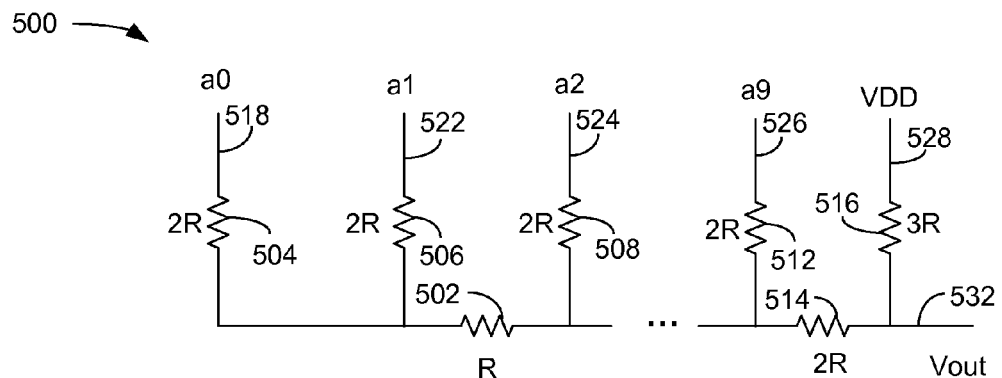
FIG. 5 is a schematic diagram illustrating an example 10 bit digital-to-analog converter (DAC) having an R2R architecture.

FIG. 5 is a schematic diagram illustrating an example 10 bit digital-to-analog converter (DAC) having an R2R architecture. The DAC 500 can be used as an implementation of the DAC 272 described above. In this example, the 10b are connected to the data stream and an 8b control word to make it effectively an 8b DAC. The 10 bit DAC 500 comprises resistors 502, 504, 506, 508, 510, 512, 514 and 516, where the values of the resistor 502 is "R", the values for the resistors 504, 506, 508, 512 and 514 are "2R" and the value of the resistor 516 is "3R." A first bit "a0" (the LSB) is input on connection 518, a second bit "a1" is input on connection 522, a third bit "a2" is input on connection 524, and a $10^{th}$ bit "a9" (the MSB) is input on connection 526. A system voltage "VDD" is provided on connection 528 to the "3R" resistor 516 to provide a Vcm voltage of VDD·0.75. The value of Vout on connection 532 is given by:

$V$out=(0.5\*(8$b$\_Dac/255)+0.5)\*$VDD$

8$b$\_Dac=0->0.5\*$VDD$

8$b$\_Dac=127->0.749\*$VDD$

8$b$\_Dac=255->1.0\*$VDD$

Figure 6:
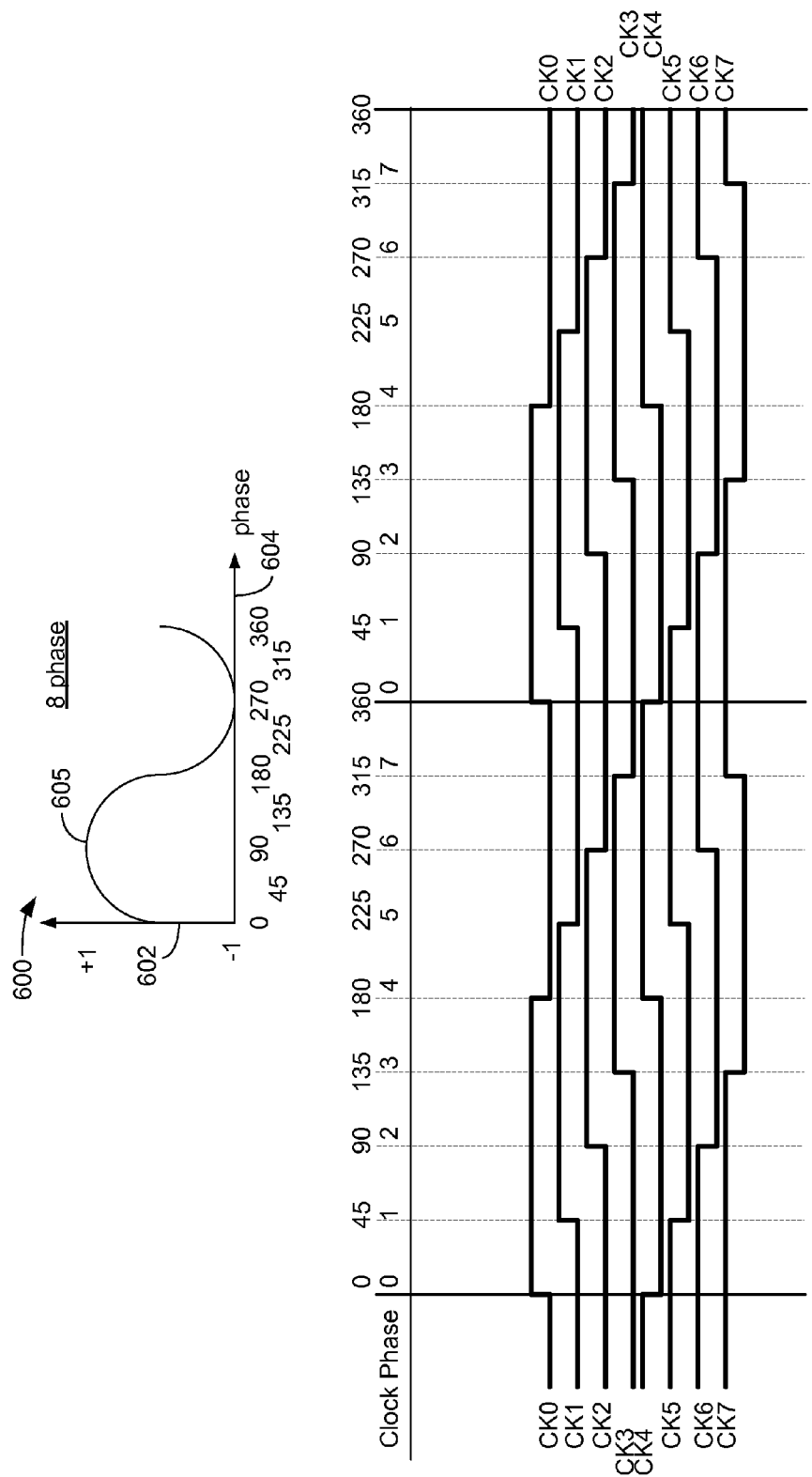
FIG. 6 is a graphical diagram of an 8 phase clock signal supplied to the DFE clock generation logic of FIGS. 3A and 3B.

FIG. 6 is a graphical diagram of an 8 phase clock signal supplied to the DFE clock generation logic of FIGS. 3A and 3B. A graphical example of the input signal provided to the DFE clock generation logic 302 is shown in the graph 600. The vertical axis 602 of the graph 600 refers to relative amplitude in volts (V), with a normalized value range of between −1 V and +1 V. The horizontal axis 604 refers to the phase of the signal on connection 303. The signal on connection 303 (FIG. 3A and FIG. 3B) is sampled at 45 degree intervals to generate the 8 clock phases in one clock cycle represented by the trace 605. The 8 clock phases are also shown as signal traces CK0 through CK7. The repeating periods "0" through "7" refer to system clock intervals, and the time between each repeating period is referred to as a 'UI' or unit interval of the system clock.

The DFE clock generation logic 302 selects the appropriate subset of the 8 clock phases to control the operation of each DFE unit cell to apply a selectable coefficient to the summing node (722, FIG. 7) via respective capacitors 321, 322, 371 and 372, to generate a widely programmable equalized output voltage. In an embodiment, the DFE clock generation logic 302 can be implemented as a 1:8 demultiplexer, where each of the 8 outputs is a signal that is separated in phase from each adjoining output by 45 degrees and having a different voltage value.

Figure 7:
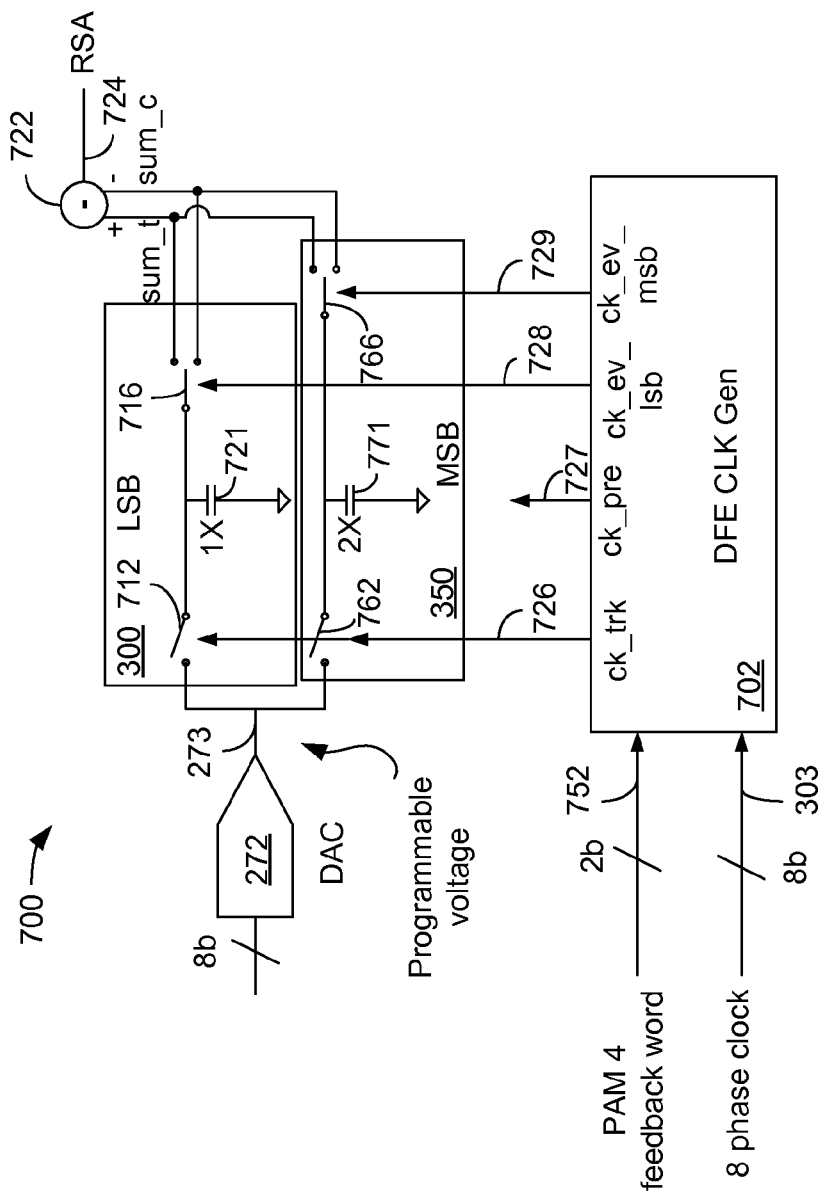
FIG. 7 is a block diagram illustrating a single-ended example of a DFE unit cell.
Figure 8:
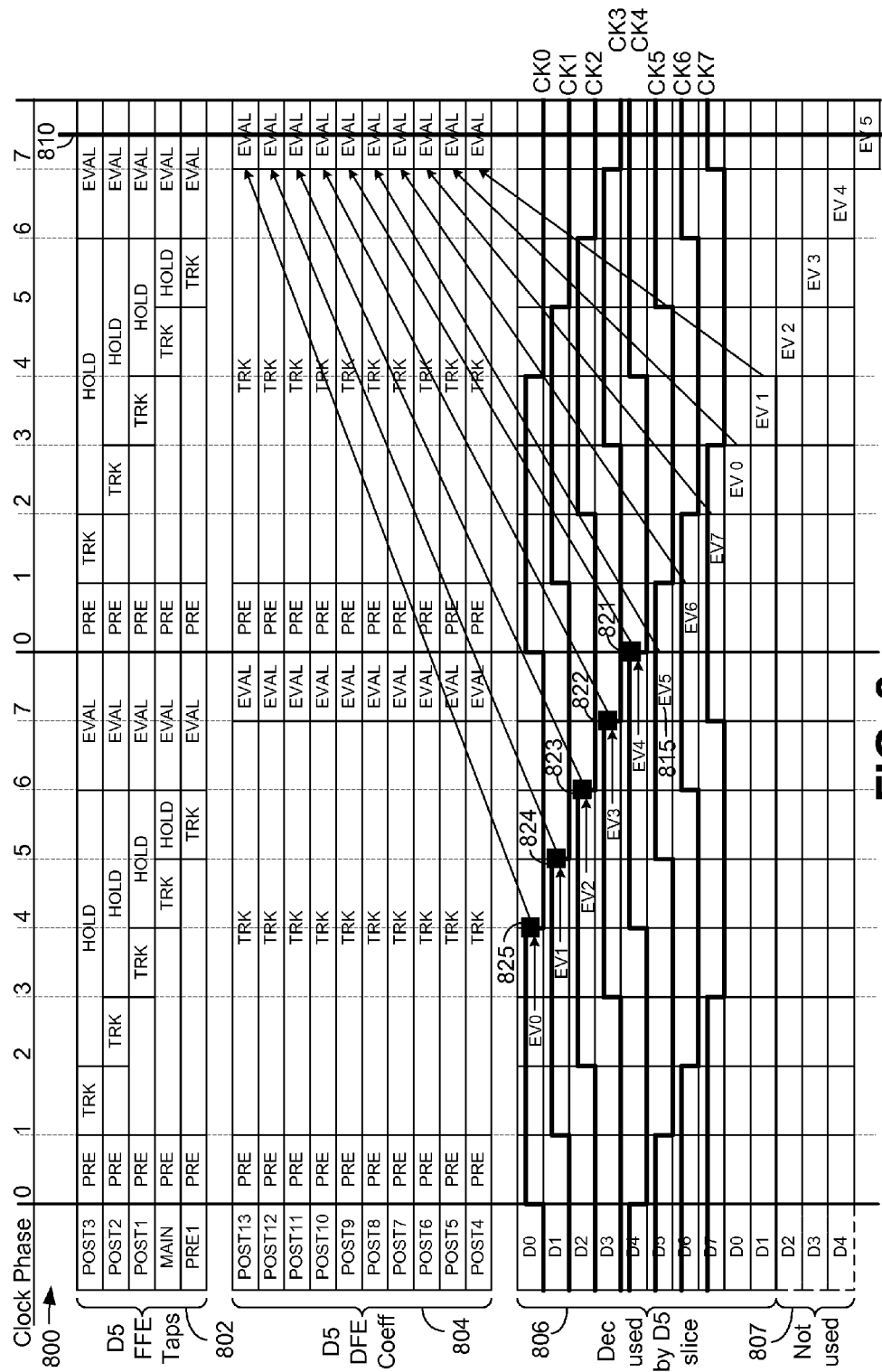
FIG. 8 is a timing diagram that can be used to control the operation of the DFE unit cell of FIG. 7.

FIG. 7 is a block diagram illustrating a single-ended example of a DFE unit cell. FIG. 8 is a timing diagram that can be used to control the operation of the DFE unit cell of FIG. 7. The DFE unit cell 700 receives input in the form of a programmable coefficient from the DAC 272. The DFE unit cell 700 comprises an LSB block 300 (FIG. 3A) and an MSB block 350 (FIG. 3B). Together, the two bits processed by the DFE unit cell 700 correspond to the two bits of the PAM 4 feedback decision word for one of the postcursors that will be processed by the DFE unit cell 700. Feedback information from additional postcursors can be added to the output of a complete pipelined DFE, by implementing more DFE unit cells 700 in parallel, all of the outputs being summed into the RSA input. In an embodiment, the DFE unit cell 700 is one of ten instances of unit cells that operate on ten postcursors that are used to equalize the communication channel. The output of each DFE unit cell is provided to a summing element 722, also referred to as a "summing node." The output of the summing element 722 is provided to the RSA 240 (FIG. 2). The summing element 722 can also be referred to as a "difference element" or "difference node" in that it additively combines the "sum_t" signal and the "sum_c" signal to find the difference between those signals.

The DAC 272 provides a programmable voltage over connection 273 to the LSB block 300 and the MSB block 350 through the switches 712 and 762, respectively. The switches 712 and 762 are controlled by the "ck_trk" signal from the DFE clock generation logic 702 over connection 726. The embodiment shown in FIG. 7 is shown as "single-ended" instead of "differential" as shown in FIGS. 3A and 3B for simplicity, where the capacitor 721 corresponds to the capacitors 321 and 322 in FIG. 3A, and the capacitor 771 corresponds to the capacitors 371 and 372 in FIG. 3B. The switch 712 corresponds to the switches 312 and 314 in FIG. 3A and the switch 762 corresponds to the switches 362 and 364 in FIG. 3B.

The switch 716 is controlled by the "ck_ev_lsb" signal over connection 728. The "ck_ev_lsb" signal corresponds to the "ck_ev0_lsb" signal and the "ck_ev1_lsb" signal in FIG. 3A. The switch 716 corresponds to the switches 316, 317, 318 and 319 in FIG. 3A.

The switch 766 is controlled by the "ck_ev_msb" signal over connection 729. The "ck_ev_msb" signal corresponds to the "ck_ev0_msb" signal and the "ck_ev1_msb" signal in FIG. 3B. The switch 766 corresponds to the switches 366, 367, 368 and 369 in FIG. 3B.

Referring to FIG. 7 and FIG. 8, the diagram 800 shows the timing for the FFE 220 and DFE 230 for a single slice of the 8 pipelined stages. The clock phases CK0 through CK7 are shown in bold and are overlaid on the cursors D0 through D7 for simplicity of illustration only and do not necessarily relate only to the D0 through D7 instances shown in FIG. 8. The repeating periods "0" through "7" along the top of FIG. 8 refer to system clock intervals, and the time between each is referred to as a 'UI' or unit interval of the system clock.

In the diagram 800, detail is provided for slice 5, which samples the main cursor at clock phase 4.

The term "PRE" refers to a period during which the capacitors in each unit cell (e.g., the capacitors 321, 322, 371 and 372 in the differential unit cells shown in FIGS. 3A and 3B, and the capacitors 721 and 771, (shown in FIG. 7) are precharged over connection 728.

The terms "TRK" or "TRACK" refer to a period during which the capacitor is connected to the output of the DAC 272. Referring to FIGS. 3A and 3B, the clock signal "ck_trk" is applied to the switches 312 and 314 to connect the capacitors 321 and 322 to the "r2r_t" and the "r2rc" output of the DAC 272, and is applied to the switches 362 and 364 to connect the capacitors 371 and 372 to the "r2r_t" and the "r2rc" output of the DAC 272.

The term "HOLD" refers to a hold period during which the capacitor is decoupled from the input of the DAC 272, and thus from the charging voltage and is allowed to remain in a charged state.

The term "EVAL" refers to a period during which the capacitors are coupled to the summing node 722. Referring to FIG. 3A, the clock signal "ck_ev0_lsb" is applied to the switches 316 and 317 (FIG. 3A) or the clock signal "ck_ev1_lsb" is applied to the switches 318 and 319 (FIG. 3A) such that the value of the capacitor 321 or the capacitor 322 (FIG. 3A) is applied to the connection 344 or 346 (FIG. 3A), to the summing node 722 and then to the RSA 240. Referring to FIG. 3B, the clock signal "ck_ev0_msb" is applied to the switches 366 and 367 (FIG. 3B) or the clock signal "ck_ev1_msb" is applied to the switches 368 and 369 (FIG. 3B) such that the value of the capacitor 371 or the capacitor 372 (FIG. 3B) is applied to the connection 394 or 396 (FIG. 3B), to the summing node 722 and then to the RSA 240.

The timing for the FFE section (220, FIG. 2) is illustrated by showing five FFE taps 802 where the main cursor is referred to as the D5 slice. Sampling capacitors are pre-charged ("PRE") in phase 0, then tracking of the input occurs at the proper times for pre, main, post1, post2, and post3 cursors. All values are held for a predetermined period of time and then applied to the summing node during the evaluation (EVAL) period at clock phases 6 and 7. Clock phase 7 is when slice 5 will have its RSA clocked, in order to determine the voltage at the summing node 722.

The DFE for slice 5 (shown using 804) is always operating in parallel with the FFE (shown using 802), and applying its output to the same summing node (summing node 722, FIG. 7) as the FFE for slice 5. Similar to the FFE 220, the DFE 230 has a pre-charge phase at clock phase 0 to eliminate residue from previous data.

In this embodiment, there are 10 DFE taps, referred to as DFE coefficients, with each tap corresponding to a particular cursor. The number of taps could be greater or smaller than 10, and depends on the particular application and the amount of equalization expected from the design. There can be more DFE taps (10) than there are pipeline stages (eight (8)), if previous decisions are stored in memory, as will be explained below. The DFE taps and the associated cursors are shown in the section 804 of the diagram 800. The diagram 800 describes the timing associated with the D5 slice. During the track phase "TRK", the DFE coefficient for each tap is sampled onto a capacitor (721/771) by the DAC 272. The DAC setting is equivalent to the value of the coefficient for a given cursor, and could also be referred to as the "tap weight". In this implementation, there are taps for the cursors POST4 through POST13. The relatively long track phase of six (6) UI allows for complete charging of the DFE sampling caps (721/771) by the DAC 272.

The section 806 shows how previous decisions from the various other DFE slices are used by the D5 slice to evaluate the DFE coefficients. The line 810 shows the instant that the RSA for slice 5 is clocked, in order to determine the voltage at the summing node 722. Note that slice 5 does not use the most recent decisions, which are from slices 4, 3, and 2, shown as "not used" using reference numeral 807. This relaxes the power needed to meet timing requirements in high data rate designs. These three decisions correspond to postcursors 1, 2, and 3, which are sampled in the FFE (shown using 802), and so the entire pipelined receiver can still compensate for distortions at these cursors. Also note, slice 5 uses the decision from its own RSA, from the previous cycle (shown using reference numeral 815), to apply the coefficient for postcursor 8. For all decisions that occurred previous to this (postcursors 9 through 13), the decision is stored in a memory element, such as a flip flop, so it will not be overwritten before slice 5 uses it. This is shown in the diagram 800 by the boxes 821, 822, 823, 824 and 825 at the outputs of the five decisions prior to postcursor 8. The boxes 821, 822, 823, 824 and 825 refer to memory elements.

Each of the traces, e.g., "D0", from FIG. 8, represents a 2-bit word which is the output decision of a slice, D0 in this example. The 2-bit decision is a PAM 4 symbol, also referred to as a PAM 4 feedback word. The MSB of that symbol will be applied to the MSB block 350 inside the DFE unit cell 700, and the LSB of that symbol will be applied to the LSB block 300 inside the DFE unit cell 700. The 2-bit PAM 4 decision is represented by the "PAM 4 feedback word" which is provided to the DFE clock generation logic 702 over connection 752. This decision drives either the "ck_ev0" signal or the "ck_ev1" signal of both the MSB block 350 ("ck_ev0_msb" and "ck_ev1_msb") and the LSB block 300 ("ck_ev0_lsb" and "ck_ev1_lsb").

FIG. 9 is a diagram showing the relationship between the output of the DFE unit cell of FIG. 7 and a PAM4 feedback word.

The RSA 240 uses three samplers, each with a different threshold level, to determine which of the four PAM 4 symbols to use to encode the summing node 722 with the correct voltage. The three threshold levels correspond to the three samplers and are illustrated using reference numerals 903, 905 and 907. For example, if the voltage on the summing node 722 is less than the voltage associated with sampler 905, but more than the voltage associated with sampler 903, then the RSA 240 will choose PAM 4 symbol 01 (voltage level 904), which will cause any DFE unit cells that use that decision word to initiate the "ck_ev0_msb" signal and the "ck_ev1_lsb" signal. Since the circuitry associated with the MSB and LSB are sized at a 2× to 1× ratio, the total charge that the DFE unit cell capacitors contribute to the summing node 722 using the PAM 4 symbol 01 will be proportional to $(-2)+(+1)=-1$. In other words, the DFE coefficient, which is stored as a DAC driven voltage onto the capacitors 721 and 771 would be applied to the summing node 722 in factors of either $-3$, $-1$, $+1$, or $+3$, depending on the decision symbol. This results in a linear contribution by the DFE decision to the summing node 722, with a constant spacing between each adjacent symbol, as shown by levels 902, 904, 906 and 908 in FIG. 9. This depiction is equivalent to an eye diagram of the DFE contribution from one DFE unit cell 700, to the summing node 722. The entire y-axis would scale with the "tap weight" for that DFE unit cell, and be programmed using the DACs in 272.

Using the same hardware, and only changing registers in 256, the design can relax from receiving PAM 4 data at a given data rate, to receiving PAM 2 data at half that data rate. One simple way to configure PAM2 operation would be to disable all the LSB cells, so that only $-2$ and $+2$ feedback contributions would result from the MSB cells. Another way would be to program the DACs that drive the three RSA thresholds (274 in FIG. 2.) to have the same level (e.g., the level corresponding to the point 905). In this manner, the two possible outputs would result in $-3$ and $+3$ contributions to the summing node 722 only (PAM 2).

An embodiment can be extended up to PAM 8 and higher using the same techniques with additional logic.

This disclosure describes the invention in detail using illustrative embodiments. However, it is to be understood that the invention defined by the appended claims is not limited to the precise embodiments described.

What is claimed is:

1. A pipelined decision feedback equalizer, comprising:
a programmable digital-to-analog converter (DAC) configured to provide a programmable voltage to a plurality of decision feedback equalized (DFE) sections;
a capacitive element associated with each of the plurality of DFE sections, each capacitive element being coupled to an input connection by a first switch and coupled to an output connection by a second switch;
clock logic configured to control the first switch and the second switch so that a predefined voltage signal is applied to each capacitive element at a predefined time such that a charge corresponding to the predefined voltage signal is applied to each capacitive element; and
the clock logic causing the second switch to couple each capacitive element to the output connection so as to apply the voltage on each capacitive element as a filter coefficient to a summing element.

2. The pipelined decision feedback equalizer of claim 1, wherein the filter coefficient is determined by a feedback word.

3. The pipelined decision feedback equalizer of claim 2, wherein the feedback word is a Pulse-Amplitude Modulated (PAM) 4 symbol having two bits, the two bits defining four different voltage levels.

4. The pipelined decision feedback equalizer of claim 2, wherein the programmable voltage signal comprises a selectable output of the DAC and allows the capacitive elements which are associated with each of the plurality of DFE sections to comprise an architecture whereby the first set of capacitors are a first value and a second set of capacitors are a second value that is twice the first value.

5. The pipelined decision feedback equalizer of claim 2, wherein each capacitive element comprises two separate capacitive elements configured to process a differential signal.

6. The pipelined decision feedback equalizer of claim 2, wherein the feedback word is a Pulse-Amplitude Modulated (PAM) 2 symbol having one bit, the one bit defining two different voltage levels.

7. The pipelined decision feedback equalizer of claim 1, wherein the plurality of DFE sections includes a first DFE section and a second DFE section, wherein a first capacitive element is associated with the first DFE section, and wherein a second capacitive element is associated with the second DFE section.

8. A method for processing a signal in a pipelined decision feedback equalizer, comprising:
providing a programmable voltage to a plurality of decision feedback equalized (DFE) sections;
providing a plurality of capacitive elements;
associating a different capacitive element in the plurality of capacitive elements with a different DFE section;
coupling a capacitive element from the plurality of capacitive elements to an input connection through a first switch;
coupling the capacitive element from the plurality of capacitive elements to an output connection through a second switch;
controlling the first switch and the second switch so that a predefined voltage signal is applied to the capacitive element at a predefined time such that a charge corresponding to the predefined voltage signal is applied to the capacitive element; and
causing the second switch to couple the capacitive element to the output connection so as to apply the voltage on the capacitive element as a filter coefficient to a summing element.

9. The method of claim 8, further comprising determining the filter coefficient using a feedback word.

10. The method of claim 9, wherein the feedback word is a Pulse-Amplitude Modulated (PAM) 4 symbol having two bits, the two bits defining four different voltage levels.

11. The method of claim 9, wherein the programmable voltage signal comprises a selectable output of the DAC and allows the plurality of capacitive elements to comprise an architecture whereby the first set of capacitors are a first value and a second set of capacitors are a second value that is twice the first value.

12. The method of claim 9, wherein the capacitive element comprises two separate capacitive elements configured to process a differential signal.

13. The method of claim 9, wherein the feedback word is a Pulse-Amplitude Modulated (PAM) 2 symbol having one bit, the one bit defining two different voltage levels.

14. A receiver system, comprising:
a linear equalizer configured to develop an input signal for a decision feedback equalizer, comprising;
a programmable digital-to-analog converter (DAC) configured to provide a programmable voltage to a plurality of decision feedback equalized (DFE) sections;
a capacitive element associated with each of the plurality of DFE sections, each capacitive element being coupled to an input connection by a first switch and coupled to an output connection by a second switch;
clock logic configured to control the first switch and the second switch so that a predefined voltage signal is applied to each capacitive element at a predefined time such that a charge corresponding to the predefined voltage signal is applied to each capacitive element; and
the clock logic causing the second switch to couple each capacitive element to the output connection so as to apply the voltage on each capacitive element as a filter coefficient to a summing element.

15. The receiver system of claim 14, wherein the filter coefficient is determined by a feedback word.

16. The receiver system of claim 15, wherein the feedback word is a Pulse-Amplitude Modulated (PAM) 4 symbol having two bits, the two bits defining four different voltage levels.

17. The receiver system of claim 15, wherein the plurality of DFE sections includes a first DFE section and a second DFE section, wherein a first capacitive element is associated with the first DFE section, and wherein a second capacitive element is associated with the second DFE section.

18. The receiver system of claim 15, wherein the programmable voltage signal comprises a selectable output of the DAC and allows the capacitive elements which are associated with each of the plurality of DFE sections to comprise an architecture whereby the first set of capacitors are a first value and a second set of capacitors are a second value that is twice the first value.

19. The receiver system of claim 15, wherein each capacitive element comprises two capacitive elements configured to process a differential signal.

20. The receiver system of claim 15, wherein the feedback word is a Pulse-Amplitude Modulated (PAM) 2 symbol having one bit, the one bit defining two different voltage levels.

* * * * *